T. C. LAW.
Combined Stove Hook, Hammer, &c.
No. 56,423. Patented July 17, 1866.
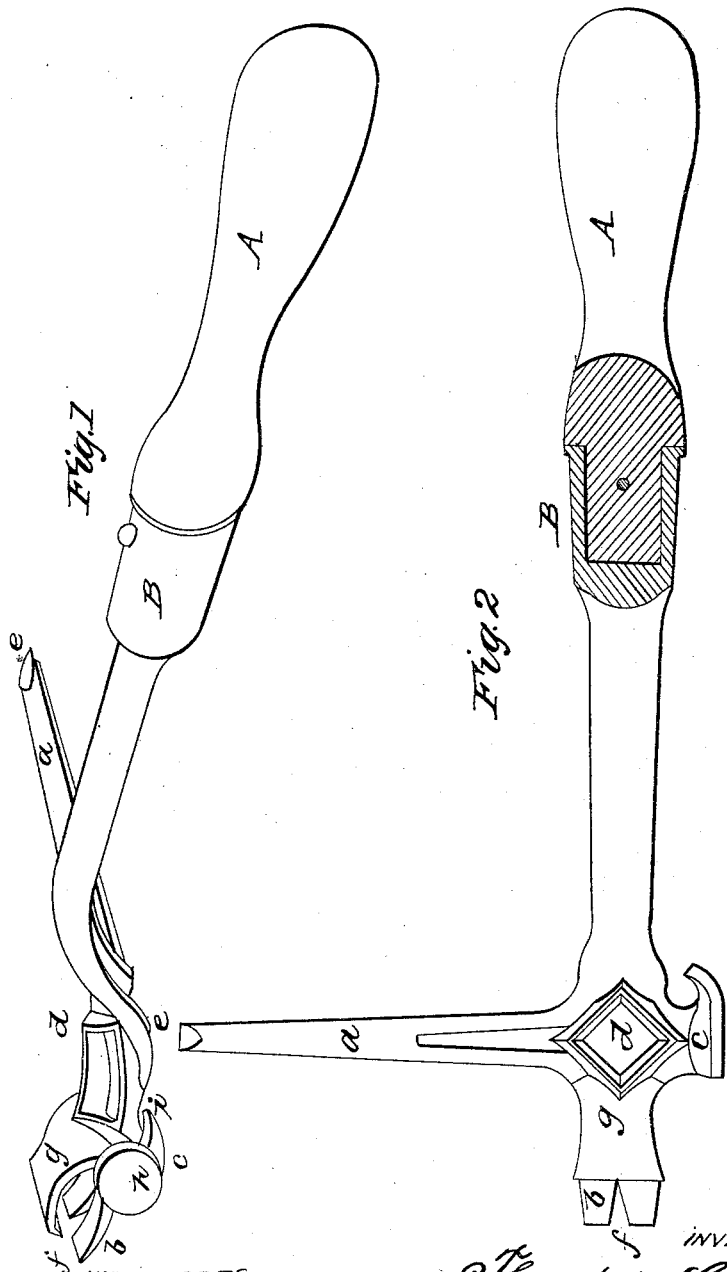

UNITED STATES PATENT OFFICE.

THEODORE C. LAW, OF GREEN ISLAND, NEW YORK.

COMBINED STOVE-HOOK, HAMMER, &c.

Specification forming part of Letters Patent No. 56,423, dated July 17, 1866.

*To all whom it may concern:*

Be it known that I, THEODORE C. LAW, of Green Island, in the county of Albany and State of New York, have invented a new and useful Appliance for Household Uses; and I do hereby declare the following to be a full, clear, and exact description of the nature, construction, and operation of the same, sufficient to enable one skilled in the branch of manufacture to which it appertains to construct and use the same, reference being had to accompanying drawings, in which—

Figure 1 is a perspective view. Fig. 2 is a top view or plan.

The invention consists of a combination of appliances for various household purposes in one tool.

A is the handle, which is inserted and secured into the socket B of the tool. At the intersection of the radial projections $a\ b\ c$ is the square hole $d$, which forms a wrench for unscrewing a screw bolt or nut, and also answers for a shaker to agitate the grate of a stove to drop the ashes. The projection $a$ answers for raking the ashes out between the bars of the grate, while at the end of it the edge $e$ furnishes a screw-driver and ice-breaker.

The projection $b$, having an angular notch, $f$, and being curved upward, constitutes a tack-drawer, while in connection with the downward-curving edge $g$ it answers to remove pans or pies from the oven, the upper edge curving over the top of the pan and the edge $b$ resting against its sides. The latter also acts on occasion as a stove-lid lifter.

The projection $c$ furnishes a face, $h$, for a hammer, and the recurving point $i$ forms a hook, whereby a pot, bucket, or bailed pan may be lifted on or off the stove or elsewhere around the kitchen, as convenience may direct.

What I claim as new, and desire to secure by Letters Patent, is—

The household implement combining the appliances substantially as described.

THEODORE C. LAW.

Witnesses:
 WILLIAM GILFILLAN,
 W. DONOHUE.